(12) United States Patent
Ren (10) Patent No.: US 11,578,620 B2
(45) Date of Patent: Feb. 14, 2023

(54) FIXTURE FOR SUPPORTING A PLURALITY OF GAS TURBINE ENGINE COMPONENTS TO BE IMAGED

(71) Applicant: ROLLS-ROYCE plc, London (GB)

(72) Inventor: Ye Ren, Singapore (SG)

(73) Assignee: Rolls Royce PLC, London (GB)

( * ) Notice: Subject to any disclaimer, the term of this patent is extended or adjusted under 35 U.S.C. 154(b) by 0 days.

(21) Appl. No.: 17/361,619

(22) Filed: Jun. 29, 2021

(65) Prior Publication Data

US 2022/0025784 A1    Jan. 27, 2022

(30) Foreign Application Priority Data

Jul. 24, 2020   (GB) ..................................... 2011507

(51) Int. Cl.
   *F01D 25/28*     (2006.01)
(52) U.S. Cl.
   CPC ........ *F01D 25/285* (2013.01); *F05D 2220/32* (2013.01); *F05D 2260/83* (2013.01); *F05D 2270/804* (2013.01); *F05D 2270/8041* (2013.01)
(58) Field of Classification Search
   CPC ............. F05D 2260/83; F05D 2230/68; F05D 2270/8041; G01B 5/0004; G01B 5/205; B23Q 3/063; G01N 2223/63
   See application file for complete search history.

(56) References Cited

U.S. PATENT DOCUMENTS

| | | | |
|---|---|---|---|
| 4,729,804 A * | 3/1988 | Dillner ..................... | B25B 11/00 156/289 |
| 5,824,897 A * | 10/1998 | Beachum ................ | G01M 1/12 73/66 |
| 6,279,888 B1 * | 8/2001 | Wal, III ................. | B23Q 3/103 269/37 |
| 9,789,513 B2 * | 10/2017 | Feuerstein ............ | C23C 14/042 |
| 2004/0124573 A1 * | 7/2004 | Elman ..................... | B23Q 3/063 269/279 |
| 2009/0064520 A1 * | 3/2009 | Sherlock ................... | G01B 3/42 33/562 |
| 2011/0211940 A1 | 9/2011 | George et al. | |
| 2013/0149450 A1 * | 6/2013 | Feuerstein ............ | C23C 14/042 118/500 |
| 2014/0250675 A1 * | 9/2014 | Sherrill .................. | B23Q 3/063 269/21 |
| 2017/0136569 A1 * | 5/2017 | Henderson ............. | B23Q 3/063 |
| 2018/0200800 A1 | 7/2018 | Hart et al. | |

(Continued)

FOREIGN PATENT DOCUMENTS

| | | |
|---|---|---|
| JP | H04282455 A  * | 10/1992 |
| WO | 2019185914 A1 | 10/2019 |

OTHER PUBLICATIONS

Great Britain search report dated Dec. 17, 2020, issued in GB Patent Application No. 2011507.7.

*Primary Examiner* — Topaz L. Elliott (74) *Attorney, Agent, or Firm* — Shumaker & Sieffert, P.A.

(57) ABSTRACT

There is described a fixture for supporting a plurality of gas turbine engine blades that are to be imaged. The mobile fixture comprises a plurality of interconnected mounts arranged to lie within a common plane, wherein each mount comprises at least one support surface for holding a respective blade. Support surfaces of respective mounts are oriented such that their respective normal vectors have the same angle with respect to the common plane.

17 Claims, 4 Drawing Sheets

(56) References Cited

U.S. PATENT DOCUMENTS

2018/0297137 A1* 10/2018 Hoskin .................... B23H 9/10
2018/0361541 A1* 12/2018 Ijspeert ................. B25B 1/2421
2019/0292911 A1* 9/2019 Stakelberg ............. B23Q 3/063
2020/0209163 A1* 7/2020 O'Loughlin ..... G01N 21/95692

* cited by examiner

FIXTURE FOR SUPPORTING A PLURALITY OF GAS TURBINE ENGINE COMPONENTS TO BE IMAGED

CROSS-REFERENCE TO RELATED APPLICATIONS

This specification is based upon and claims the benefit of priority from United Kingdom patent application number GB 2011507.7 filed on Jul. 24, 2020, the entire contents of which is incorporated herein by reference.

BACKGROUND

Technical Field

This present disclosure concerns the field of gas turbine engines, and in particular to a system and method for imaging and automatically investigating discoloration on a component of a gas turbine engine.

Description of the Related Art

Various components of gas turbine engines are prone to corrosion due to a chemical process known as "sulfidation", by which sulfides are formed in the component materials and can cause the materials to degrade over time.

Sulfidation tends to occur prominently on components that are exposed to high temperature environments, such as the blades of the high-temperature turbine section (e.g. the intermediate pressure turbine (IPT) section) of the engine. The shank regions of such blades are especially prone to sulfidation, which is recognisable by a discoloration of the material in those regions.

It is established practice for an investigator to perform a visual analysis of the blades to detect the presence of sulfidation on the shank region of an IPT blade by manually inspecting the region and identifying a discoloration on one or both of the concave and convex sides of the blade. It is also known for the investigator to, during the visual analysis, quantify numerically the extent of sulfidation by visually inspecting the extent of discoloration in the shank region. A known estimation standard for this is to classify the extent of sulfidation of the shank region by scoring the extent of discoloration with a "discoloration score" between "1" and "5", where the score "1" means no or little discoloration (and thus minimal sulfidation) and score "5" means severe discoloration (severe sulfidation).

Figure 1:
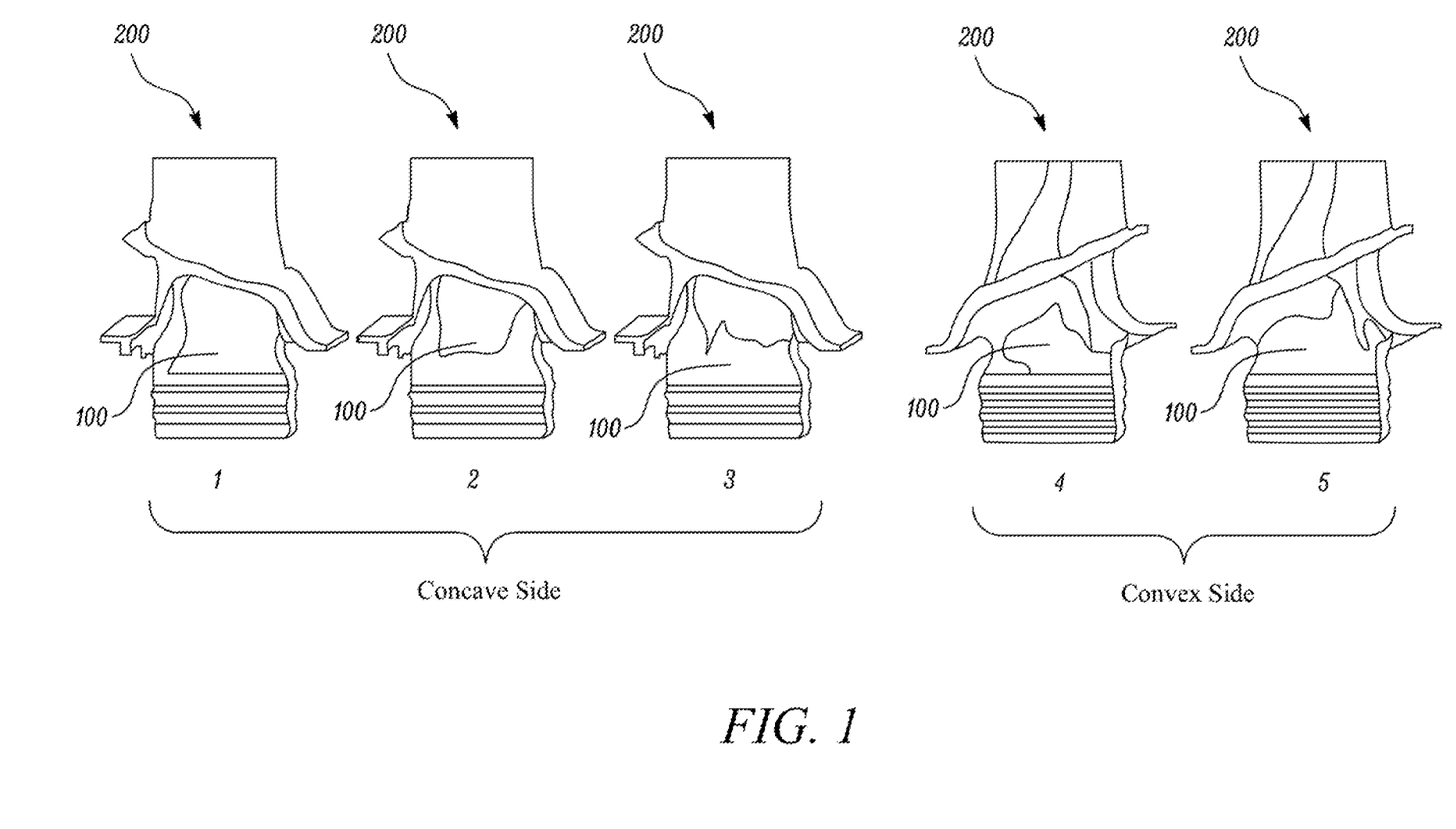
FIG. 1 shows a prior art discoloration guide that can be used as a reference by an investigator when performing a manual visual analysis of intermediate pressure turbine (IPT) blades of a gas turbine engine.

FIG. 1 shows a discoloration guide that is typically provided to investigators for reference when performing a visual analysis to give a discoloration score to the IPT blades of a gas turbine engine. The discoloration guide includes five images of the shank regions 100 of respective IPT blades 200, where each blade 200 shows a single level of discoloration and thus sulfidation severity.

Given that the above standard for visual analysis involves an investigator's manual assessment of an IPT blade, it is an inherently subjective assessment which relies on the perception of the investigator. While such a subjective classification is quick to use and therefore widely employed, it has been proven to be limited due to considerable subjective variability of an investigator.

Accordingly, it may be desirable to provide an improved system and method for performing a visual analysis to investigate discoloration on a component of a gas turbine engine.

SUMMARY

According to an aspect of the technology described herein, there is provided a computer-implemented method for investigating discolouring on components of a gas turbine engine, the method comprising reading data representing an image of a batch of one or more components to be investigated, wherein the image data comprises a set of colour values for pixels in the image. The method further comprises, for each component in the batch: identifying a group of one or more pixels in the image that represents a region of interest of the component in question; comparing a colour value of a pixel in the group to a predetermined threshold colour value for the component, wherein the predetermined threshold colour value is associated with discoloration of the component in the region of interest; and determining whether the region of interest is discoloured based on the comparison.

By determining whether a component of a gas turbine engine is discoloured in a region of interest, the technology described herein provides a useful indication as to the state of the component. For example, as described above, corrosion caused by sulfidation is recognisable by a discoloration of the component. Therefore, information as to whether a component is discoloured can be used advantageously to identify components on which sulfidation-based corrosion exists, so that those components may be replaced or otherwise repaired.

Further, by investigating discolouring on components of a gas turbine engine in a manner of the technology described herein, it is possible to perform an objective and reliable visual analysis of the components of the gas turbine engine. This is in contrast to conventional arrangements in which visual analysis involves an investigator's manual assessment of a component which, as described above for cases where the components are IPT blades, is an inherently subjective assessment which relies on the perception of the investigator.

The predetermined threshold colour value may be associated with discoloration as a result of sulfidation in the region of interest of the component.

The colour value of the pixel in the group and the predetermined threshold colour value may be Lightness colour values in the LAB colour space.

The set of colour values in the image data (that is read) may be in the RGB colour space. In such cases, the method may further comprise converting the set of colour values from the RGB colour space to the LAB colour space, before said step of comparing the colour value of the pixel in the group with the predetermined threshold colour value.

The method may further comprise removing a Hue component of the colour values before said step of comparing the colour value of the pixel in the group with the predetermined threshold colour value.

In embodiments, it is determined that the region of interest is discoloured if the colour value of the pixel in the group is equal to or less than the predetermined threshold colour value.

The method may further comprise, for each component in the batch:
comparing, for each pixel in the group, the colour value of the pixel to the predetermined threshold colour value, to determine whether the pixel represents a discoloured part of the region of interest; calculating a ratio of the sum of pixels in the group that represent discoloured parts of the region of interest and the total number of pixels in the group; and determining an extent of discoloration in the region of interest based on the calculated ratio.

The method may further comprise: quantizing a range of possible values of the ratio into a plurality of discrete sub-ranges, based on a statistical analysis of reference data determined for components for which the extent of discoloration in the region of interest has been determined independently; and scoring the extent of discoloration in the region of interest based on which sub-range the calculated ratio falls within.

The component may be classified as being damaged or not, based on the extent of discoloration (e.g. the discoloration score).

Identifying a group of one or more pixels in the image that represents a region of interest of the component in question may comprise: identifying pixels in a region of the image that most closely matches a predefined template image of the region of interest as the group of one or more pixels that represents the region of interest of the component.

This may comprise performing a template matching operation. For example, the method may comprise determining, for each one of a plurality of regions in the image, an extent of similarity between colour values of pixels in the region and colour values of pixels in the predefined template image of the region of interest. Pixels in a region for which it is determined that the colour values have the greatest extent of similarity with the colour values of pixels in the predefined template image of the region of interest, may be identified (and used) as the pixels in the region of interest.

The method may further comprise, before identifying a group of one or more pixels in the image that represents a region of interest of the component: adjusting colour values of pixels in the image based on a predetermined correction factor, wherein the predetermined correction factor indicates an extent by which the image is under or over exposed.

The correction factor may indicate an extent by which pixel colour values representing a middle-gray reference object in the image (or a separate reference image) differ from a predefined value representing the mid-tone of the image.

The batch of one or more components to be investigated may comprise plural components of the gas turbine engine.

The method may further comprise: dividing the image into a plurality of sub-images, wherein each image represents a respective component of the batch. Identifying a group of one or more pixels in the image that represents a region of interest of the component in question may comprise identifying a group of one or more pixels in the sub-image to which the component in question corresponds.

The image may include a fiducial marker in addition to the batch of plural components.

In such cases, the method may further comprise, before identifying a group of one or more pixels in the image that represents a region of interest of the component in question, transforming the sub-images to a uniform size. This may be done by: determining the size of the fiducial marker in the image; determining a scaling factor for the sub-images based on the determined size of the marker in the image and a predefined target size for the marker in the image; and scaling the sub-images by the scaling factor.

In additional or alternative embodiment in which the image includes a fiducial marker in addition to the batch of plural components, the method may further comprise: determining an order by which the sub-images should be processed based on the fiducial marker; and processing the sub-images, to investigate discolouration of the respective components, in the determined order.

The blades may be arranged at spaced positions along a circumferential line about the fiducial marker, such that each blade has a unique angular position about the marker in the image. The marker may indicate the unique angular position of a first blade to be investigated for discoloration and a circumferential direction about the marker along which the other blades should be investigated in series after the first blade. Accordingly, the method may further comprise: reading the data stored in the marker; and determining the order by which the sub-images should be processed based on the unique angular position of a first blade to be investigated for discoloration and the circumferential direction about the marker along which the other blades should be investigated in series after the first blade.

The method may further comprise, before identifying a group of one or more pixels in the image that represents a region of interest of the component in question: rotating one or more of the sub-images such that the sub-images have a uniform orientation.

According to another aspect of the technology described herein, there is provided a computer-implemented method for investigating discolouring on components of a gas turbine engine, the method comprising: receiving image data representing a pair of images of a batch of one or more components, wherein a first image of the pair of images represents the batch of one or more components in a first facing orientation and wherein a second image of the pair of images represents said batch of one or more components in a second facing orientation that is different to the first facing orientation; and performing the method of any one of the preceding statements for each image in the pair of images.

The first image may include a first fiducial marker and the second image may include a second fiducial marker. In such cases, the method may further comprise determining the facing orientation of the batch of one or more components in the first image based on the first fiducial marker and determining the facing orientation of the batch of one or more components in the second image based on the second fiducial marker.

The method may further comprise storing the image data, and optionally data indicating the result of the determination based on the image data, in a memory archive for subsequent review.

The one or more components to be investigated may be compressor blades or turbine blades of a gas turbine engine.

The method of the technology described herein may be repeated for plural pairs of images of respective batches of one or more components. Therefore, according to another aspect of the technology described herein, there is provided a computer-implemented method for investigating discolouring of plural batches of components of a gas turbine engine, wherein the method comprises: receiving image data for plural pairs of images of respective batches of at least one component; and performing the method of any preceding statement for respective pairs of images.

According to another aspect of the technology described herein, there is provided a computer processor configured to perform the method of any preceding statement.

According to another aspect of the technology described herein, there is provided a computer-readable storage medium comprising computer readable instructions that, when executed by a computer processor, cause performance of the method of any preceding statement.

In addition to the above, the technology described herein is concerned with a fixture for supporting the batch of one or more components (in the form of blades of a gas turbine engine) that are to be imaged, so that the image data can be processed and used for investigating discolouring on the components in a manner described above.

Thus, according to another aspect of the technology described herein, there is provided a fixture for supporting a plurality of gas turbine engine blades that are to be imaged, the fixture comprising: a plurality of interconnected mounts arranged to lie within a common plane; wherein: each mount comprises at least one support surface for supporting a respective blade; and support surfaces of respective mounts are uniformly shaped and oriented such that their respective normal vectors have the same angle with respect to the common plane.

By providing a fixture in which uniformly shaped support surfaces of respective mounts are oriented such that their respective normal vectors have the same angle with respect to the common plane, the fixture allows for the blades to be supported with a common facing orientation with respect to the camera. This in turn facilitates more efficient image processing for the subsequent discoloration investigation. Further, by ensuring that the blades have a common and consistent orientation in the images, the fixture facilitates an accurate and fair comparison of the regions of interest across different blades in an image. This may be advantageous in that the accuracy and repeatability of the visual analysis can be increased.

The plurality of mounts may be interconnected via a central hub and may be arranged at spaced positions in a circumferential line about the central hub, such that the at least one support surface of each mount has a unique angular position about the hub.

The fixture may comprise a gray card or may have a middle gray reference colour.

Each mount may comprise a first support structure comprising a base portion and two parallel side walls extending from a first support surface of the base portion. A space may be defined between the two side walls for receiving a root portion of the respective blade.

The first support surfaces of respective mounts may be oriented such that their respective normal vectors have the same angle with respect to the common plane.

The side walls may extend perpendicularly to the common plane. The first support surface of the base portion may be oblique to the side walls.

Each mount may comprise a second support structure comprising a cuboidal block having a second support surface that is parallel to the common plane. The second support surfaces of respective mounts may be oriented such that their respective normal vectors have the same angle with respect to the common plane.

Each mount may comprise a third support structure in the form of a block having a third support surface for supporting an aerofoil section of the respective blade. The third support surfaces of respective mounts may be oriented such that their respective normal vectors have the same angle with respect to the common plane.

The third support surface may be a concave support surface for abutting a convex surface of the aerofoil section. Alternatively, the third support surface may be a convex support surface for abutting a concave surface of the aerofoil section.

According to another aspect of the technology described herein, there is provided a kit for supporting a plurality of gas turbine engine blades in two different facing orientations for imaging. The kit comprises a first fixture comprising a third support structure fixture in the form of a block having a concave support surface for abutting a convex surface of the aerofoil section, for supporting the blade in a first facing orientation at which concave sides of the blades face away from the mounts. The kit further comprises a second fixture comprising a third support structure fixture in the form of a block having a convex support surface for abutting a concave surface of the aerofoil section, for supporting the blade in a second facing orientation at which convex sides of the blades face away from the mounts.

The first and second fixtures of the kit may comprise any one or more features of the fixtures described above in the preceding statements.

The first fixture and the second fixture may be configured to cooperate in that the first fixture comprises a first coupler that is configured to engage a second coupler of the second fixture, to removably couple the first fixture and the second fixture in a facing configuration. When in the facing configuration, the mounts of the first fixture may be aligned with the mounts of the second fixture such that a blade can be retained in a space between the support surfaces of a respective pair of aligned mounts.

The first coupler and the second coupler may comprise a plug-and-socket arrangement.

The first coupler and the second coupler may be configured such that the first fixture and the second fixture are able to be coupled in one (aligned) facing configuration only.

For each one of the first fixture and the second fixture, the plurality of mounts may be interconnected via a central hub and the plurality of mounts may be arranged at spaced positions in a circumferential line about the central hub, such that the at least one support surface of each mount has a unique angular position about the hub.

Each one of the first fixture and the second fixture may comprise a fiducial marker that is readable by a computer processor when digitally imaged. The fiducial marker of the first fixture may indicate the unique angular position of a mount of the first fixture. The fiducial marker of the second fixture may also indicate the unique angular position of a mount of the second fixture that will be aligned with the indicated mount of the first fixture, when the first fixture and the second fixture are in the facing configuration.

The fiducial marker of the first fixture may indicate a first circumferential direction about the hub of the first fixture and the fiducial marker of the second fixture may indicate a second circumferential direction about the hub of the second fixture. The first direction may be opposite to the second direction.

The fiducial marker of the first fixture may indicate the first facing orientation at which the mounts of the first fixture are configured to support the blades. The fiducial marker of the second fixture may indicate the second facing orientation at which the mounts of the second fixture are configured to support the blades.

The technology described herein is also concerned with a method of using the fixture(s) to capture one or more images of the (batch of) plurality of gas turbine engine blades.

Thus, according to another aspect of the technology described herein, there is provided a method of imaging a plurality of gas turbine engine blades, comprising: providing a fixture substantially as described above; providing a first batch of plural gas turbine engine blades to be imaged; providing a digital camera for imaging the batch of blades; placing the fixture on a (e.g. horizontal) platform, such that the support surfaces of the fixture face the camera; placing respective blades of the first batch on the at least one support surface of respective mounts of the fixture, such that the blades have a first common facing orientation with respect to the camera (e.g. the first facing orientation or the second facing orientation described above, depending on the fixture used); and using the digital camera to capture an image of the blades in the first common facing orientation.

According to another aspect of the technology described herein, there is provided a method of imaging a plurality of gas turbine engine blades, comprising: providing a kit substantially as described above; providing a first batch of plural gas turbine engine blades to be imaged; providing a digital camera for imaging the batch of blades; placing a first one of the pair of fixtures (e.g. the first fixture) on a (e.g. horizontal) platform, such that the support surfaces of the fixture in question face the camera; placing respective blades of the first batch on the at least one support surface of respective mounts of the fixture in question, such that the blades have a first common facing orientation (e.g. the first facing orientation or the second facing orientation described above, depending on the fixture used) with respect to the camera; using the digital camera to capture an image of the blades in the first common facing orientation; coupling the pair of fixtures such that the blades are retained in a space between aligned mounts of the pair of fixtures; flipping the coupled assembly and placing the second one of the pair of fixtures on the platform such that the support surfaces of the fixture in question face the camera; decoupling the pair of fixtures to reveal the blades in a second common facing orientation with respect to the camera (e.g. the other one of first facing orientation or the second facing orientation); and using the digital camera to capture an image of the blades in the second common facing orientation.

The method may further comprise, after using the digital camera to capture an image of the blades in the second common facing orientation: providing a second batch of plural gas turbine engine blades to be imaged; placing respective blades of the second batch on the at least one support surface of respective mounts of the second one of the pair of fixtures, while the fixture in question lies on the platform, such that the blades have the second common facing orientation with respect to the camera; using the digital camera to capture an image of the blades in the second common facing orientation; coupling the pair of fixtures such that the blades are retained in the space between aligned mounts of the pair of fixtures; flipping the coupled assembly and placing the first one of the pair of fixtures on the platform such that the support surfaces of the fixture in question face the camera; decoupling the pair of fixtures to reveal the blades in the first common facing orientation with respect to the camera; and using the digital camera to capture an image of the blades in the first common facing orientation.

Using the digital camera to capture an image of the blades in the first facing orientation or the second facing orientation may comprise orienting the camera such that its image plane is parallel to the common plane of the fixture in question. This may be done by adjusting a rig that supports the camera at an adjustable orientation from the platform.

The computer processor (and various associated elements) described herein may comprise any suitable circuitry to cause performance of the methods described herein and as illustrated in the Figures. The processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The processor may include at least one microprocessor (e.g. for an electronic display) and may comprise a single core processor, may comprise multiple processor cores (such as a dual core processor or a quad core processor), or may comprise a plurality of processors (at least one of which may comprise multiple processor cores).

The processor may comprise and/or be in communication with one or more memories that store the data described herein, and/or that store software for performing the processes described herein.

The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive).

The memory may store a computer program comprising computer readable instructions that, when read by a processor, causes performance of the methods described herein, and as illustrated in the Figures. The computer program may be software or firmware, or may be a combination of software and firmware.

The computer readable storage medium may be, for example, a USB flash drive, a compact disc (CD), a digital versatile disc (DVD) or a Blu-ray disc. In some examples, the computer readable instructions may be transferred to the memory via a wireless signal or via a wired signal.

The digital camera may be any form of camera that is suitable for capturing digital images in the visible spectrum. The digital camera may be in the form of a digital single-lens reflex (DSLR) camera, which is commonly known in the art.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments are described herein by way of example only, with reference to the Figures, in which.

DETAILED DESCRIPTION

Figure 2:
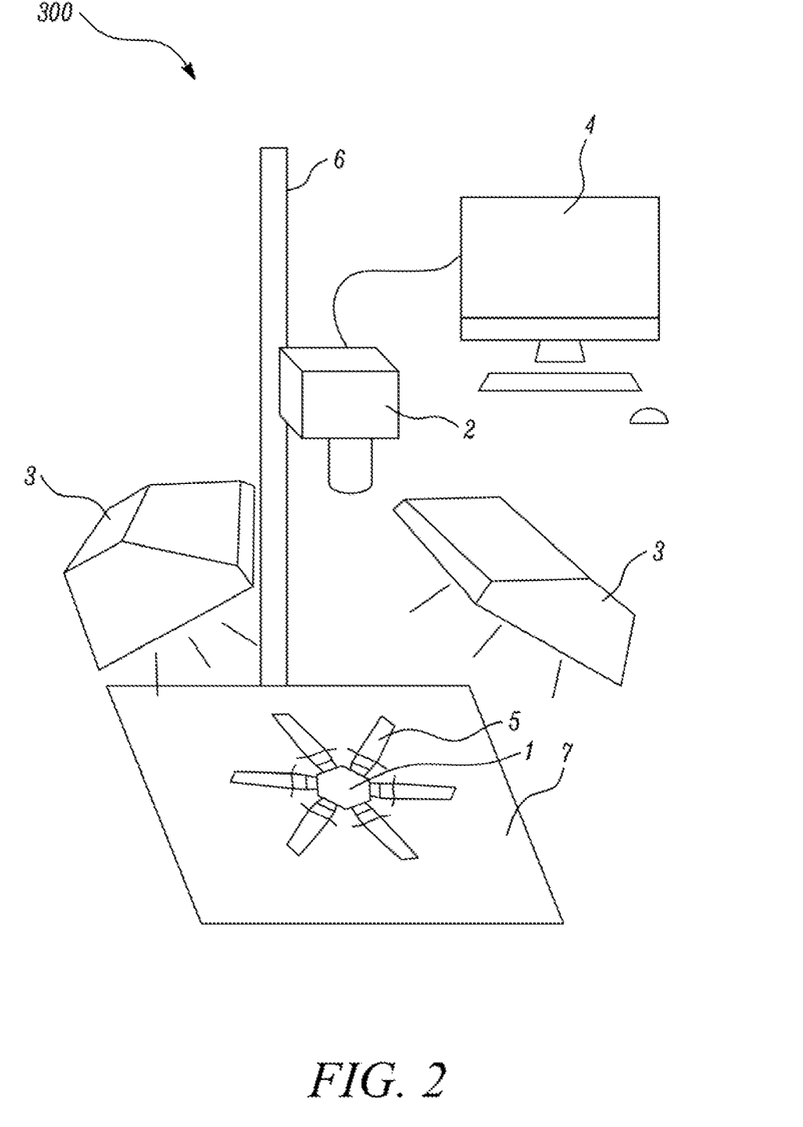
FIG. 2 is a schematic illustration of a system for automated visual analysis to investigate discolouring on components of a gas turbine engine, in accordance with an embodiment of the technology described herein.

FIG. 2 is a schematic illustration of a system for automated visual analysis to investigate discolouring on components of a gas turbine engine, in particular to classify an extent of discoloration (and thus sulfidation) in regions of interest on respective components of the gas turbine engine.

In the embodiment of FIG. 2, the components to be investigated are blades of the intermediate pressure turbine (IPT) of a gas turbine engine that, as mentioned above, are particularly susceptible to corrosion as a result of sulfidation. However, it will be appreciated that the system (and corresponding method) of the technology described herein is equally suitable (and thus can be used) to determine the extent of sulfidation of other components of a gas turbine engine. Further, the technology described herein is not restricted to use with components of gas turbine engines, but is instead applicable to any component that may be susceptible to sulfidation.

The system 300 comprises a mobile (i.e. moveable) support fixture 1 that is positioned on a platform 7 and that holds a batch of six blades 5 entirely within the field of view of a digital camera 2. The lens of the digital camera 2 faces the fixture 1 and blades 5 and is connected to an adjustable rig 6 that allows the height of the camera 2 to be adjusted. In this way, the distance between the camera 2 and the fixture 1, and thus the field of view of the camera 2 with respect to the blades 5, can be controlled. The focal length of the camera lens may also be adjustable to match the distance between the camera 2 and the fixture 1. The camera is oriented such that an image plane of the camera 2 is parallel to the platform 7.

The batch of blades may be one of plural batches of blades that are from the same IPT and that are to be imaged and subsequently subjected to the visual analysis. The number of blades to be imaged as a batch has been specifically chosen as six for two reasons. Firstly, the number six is a factor of the typical total number of blades in an IPT, namely one-hundred and fourteen. Secondly, having six blades allows an ergonomic setup for the system 300. For example, to image the batch of six blades 5, the camera height (measured from the platform 7) will be set to approximately 0.7 metres to ensure that the blades 5 fall entirely within the field of view of the camera 2 using a standard zoom lens. In this way, when the platform is a conventional desk or bench, for example, the camera will be located at an ergonomically convenient height (of typically around 1.4 metres) for the user, thereby enabling the user to manually set the system 300 in a quicker and more efficient manner. This is especially the case compared to arrangements where the batch of blades to be imaged is greater than six, e.g. eight or twelve, in which case the camera 2 will need to be mounted higher at an ergonomically inconvenient height for the user to capture a single image of the batch of blades. Further, having less than six, e.g. three or four, blades per batch will require a significantly larger number of images to be taken to form a complete set of blade images for the IPT, thereby increasing the burden on the user and the overall time required to acquire the images.

The digital camera 2 is configured to capture images in the visible spectrum and any camera suitable for that purpose can be used. In the illustrated example, the camera 2 is in the form of a digital single-lens reflex (DSLR) camera, which is commonly known in the art.

The system 300 comprises two florescent lamps 3 that serve as an ambient light source for illuminating the batch of blades 5 during image capture. This may provide consistent lighting when capturing separate images, thereby increasing the repeatability and accuracy of the visual analysis as compared to hypothetical arrangements in which different ambient lighting conditions across different image captures affect the accuracy of the analysis.

The camera 2 operates to convert visible light detected at a sensor (not shown) into an image that represents the colour and brightness of the detected light. Each image is represented by a two-dimensional array of pixels (picture elements), wherein each pixel in the array has a respective (x, y) co-ordinate position within the image (array) and a corresponding colour in the Red, Green, and Blue (RGB) colour space. The colour of a pixel in the array is a combination of red, green and blue components (also referred to herein as channels) and is represented by three colour values, one value for each of the red, green and blue components. Each RGB colour value for a pixel can be (and in this embodiment is) stored in memory as an 8-bit integer value giving a range of possible intensity values from 0 to 255 (where 0 is dark and 255 is bright). Thus, each pixel will have a corresponding set of 24-bit image data.

The digital camera 2 is in wired or wireless communication with a computer 4 which has an input/output interface for communication with a user. The computer 4 is configured to receive the captured images (i.e. the image data) from the camera 2 so that they can be used by a processor (not shown) of the computer 4 to perform the automated visual analysis. The computer (or a network in communication with the computer) comprises a memory for storing the captured images, e.g. for use during the visual analysis or for archiving the images for future revision or inspection.

Figure 3:
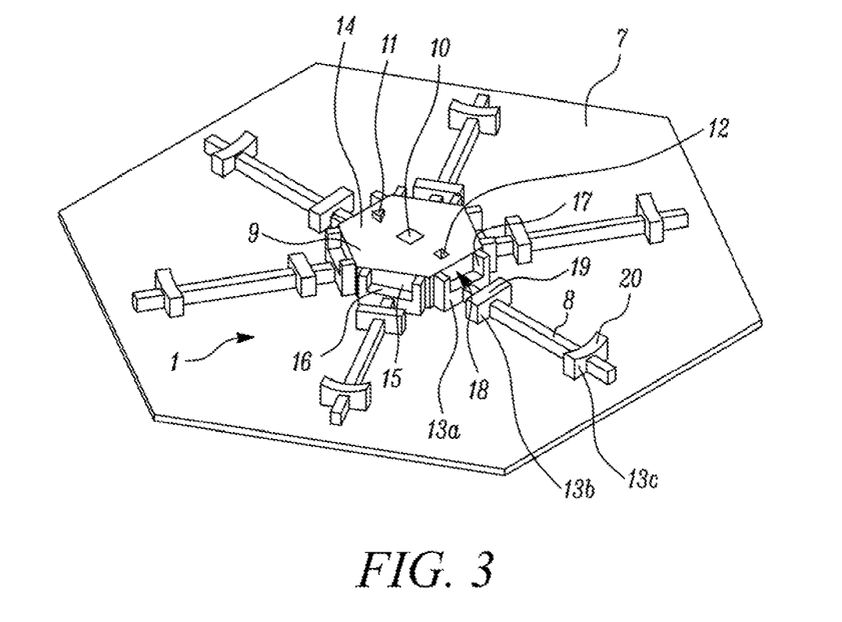
FIG. 3 is a schematic illustration of a first fixture for holding six IPT blades to be imaged for the investigation.
Figure 4:
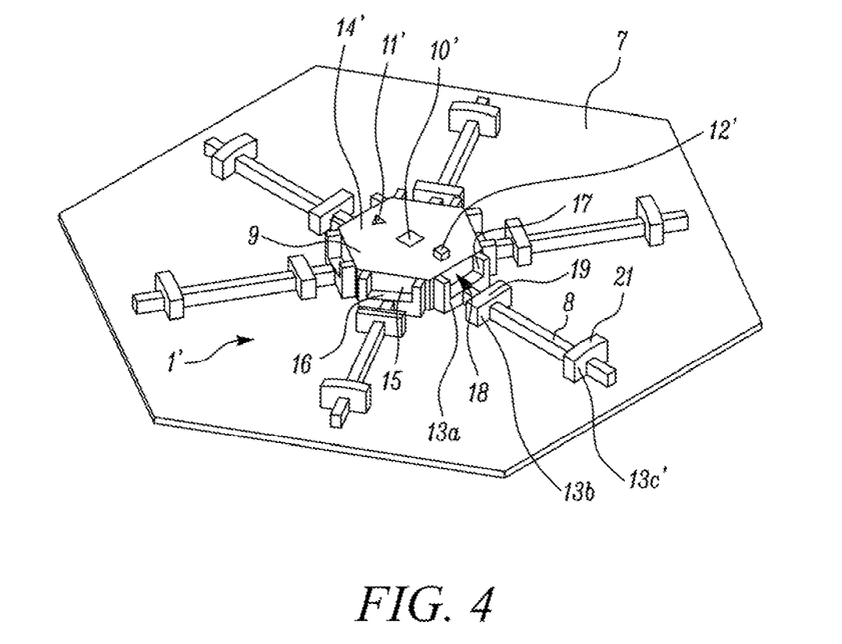
FIG. 4 is a schematic illustration of a second fixture for holding six IPT blades to be imaged for the investigation.

As mentioned above, a manual visual analysis of an IPT blade typically includes an investigation of both the concave and convex sides of the blade. Accordingly, in embodiments where the component to be automatically investigated is an IPT blade, there is provided two separate support fixtures: a first fixture for holding and orienting the blades such that the concave sides of the blades (including the shank regions) face the camera; and a second fixture for holding and orienting the blades such that the convex sides of the blades (including the shank regions) face the camera. The first and second fixtures are illustrated in FIGS. 3 and 4, respectively, which will now be described in combination. It is noted here that like features of the first and second fixtures are given like reference numerals in FIGS. 3 and 4.

Each support fixture 1, 1' comprises six mounts (one for each blade to be held by the fixture) that extend from a central hub 9 that is common to each mount. The central hub 9 is in the form of a solid block having a hexagonal cross-section. An upper hexagonal surface 14 of the hub 9 is parallel to a platform 7 on which the fixtures 1, 1' are supported, and is spaced from the platform by six side surfaces 15 that extend substantially vertically between the upper surface 14 and a lower hexagonal surface (not shown) of the hub 9.

Each mount comprises an arm 8 that extends radially outwards from the central hub 9. Each arm 8 has a first end that is connected to a respective side surface 15 of the hub 9 and a second end that is distal to the hub 9. Each arm 8 (and thus mount) extends end-to-end in a plane that is common to the arms and which is parallel with the upper hexagonal surface 14 and the platform 7. The arms 8 are arranged equidistant in a circumferential line about the central hub 9, wherein neighbouring, adjacent arms 8 along the circumferential line are separated by sixty degrees in the circumferential direction. In this way, the mounts are arranged in a circular array of positions, wherein each position in the array has a unique angular position about the hub 8.

Each arm 8 is able to support a respective blade in an orientation where a longitudinal extent of the blade (i.e. a radial span of the blade from its root portion to the tip of its aerofoil section) is aligned with the radial direction along which the arm 8 extends outwards from the hub.

To support the blade, a first support structure 13a is provided at the first end of the arm 8 and abuts a side surface 15 of the hub 9. The first support structure 13a comprises a base portion 16, which has an upper planar support surface for the blade, and two side walls 17 extending vertically from the upper support surface and away from the platform 7. In this way, the first support structure 13a has a substantially C-shaped or U-shaped structure that defines a space 18 between the two side walls 17 that is suitable for receiving the root portion of the blade (not shown).

The shape of the space 18 conforms to the shape of the blade root that is to be received therein. In that regard, a horizontal distance (parallel to the upper surface 14) between the two side walls 17 is substantially the same as (or slightly larger than) a longitudinal extent of a blade root (i.e. a direction along the blade root that is parallel to the direction that the blade root is configured to be inserted into a hub of the IPT), so that the blade root can be snugly received within the space 18. The horizontal distance between the two side walls 17 may be in the range of 4-6 centimetres, preferably 5 centimetres.

The upper support surface of the base portion 16 may be inclined with respect to the horizontal and vertical directions. Further, the upper support surfaces of all of the first support structures 13a (and their normal vectors) have the same inclination with respect to the common plane along which the arms 8 extend. For example, the upper surface of the base portion 16 of each mount may be inclined at an angle in the range of 5-15 degrees, preferably 10 degrees, with respect to the horizontal. Further, the vertical extent of each side wall 15 from the base portion 16 is substantially half of the transverse extent of the blade root that is to be received in the space 18. As an example, the vertical extent of a side wall 15 from the base portion 16 may be in the range of 0.5-1.5 centimetres, e.g. 1 centimetre. In this way, the first support structure 13a can fix the blade in a constant position relative to the central hub 9 and prevent yaw rotation of the blade, i.e. prevent rotation of the blade about a yaw axis of the blade parallel to the Normal of the platform 7. Further, the plurality of blades will be supported at the same orientation with respect to the common plane and thus have a common facing orientation with respect to the image plane of the camera.

Each arm 8 further comprises a second support structure 13b at a position between the first end and the second end of the arm 8. The second support structure 13b is in the form of a horizontal block having a substantially cuboidal structure. An upper planar support surface 19 of the block 13b is suitable for contacting a surface of the blade to limit roll and pitch rotations of the blade (i.e. rotation of the blade about the longitudinal axis and the transverse axis of the blade, respectively) so that a surface of the shank region to be investigated is held parallel to the image plane of the camera. The upper support surfaces 19 of the second support structures 13b are oriented such that their respective normal vectors have the same angle with respect to the common plane. In this way, the plurality of blades will have a common facing orientation with respect to the image plane of the camera.

Towards the second end of each arm 8, there is provided a third support structure 13c for supporting an aerofoil section of the blade. It will be appreciated that an aerofoil section of an IPT blade will have two surfaces, a first, convex surface and a second, concave surface, which define the convex and concave sides of the blade, respectively. Accordingly, the third support structures 13c of the first fixture 1 may be configured to support the blades in a first (common) facing orientation at which the concave sides of the blades face away from the mounts and toward the camera. Correspondingly, the third support structures 13c' of the second fixture 1' may be configured to support the blades in a second (common) facing orientation at which the convex sides of the blades face away from the mount and toward the camera.

In the first fixture 1 of FIG. 3, each third support structure 13c is in the form of a block that has an upper concave support surface 20 that is configured to contact the convex surface of the aerofoil section of a blade. The concave surface 20 of the block 13c substantially conforms to the shape of the convex surface of the aerofoil section. This may increase stability of the blade on the block 13c and ensure correct orientation of the blade when it is connected to the first support fixture 1. The concave surface 20 also limits roll and pitch rotations of the blade.

In the second fixture 1' of FIG. 4, each third support structure 13c' is in the form of a block that has an upper convex support surface 21 that is configured to contact the concave surface of the aerofoil section of a blade. The convex surface 21 of the block 13c' substantially conforms to the shape of the concave surface of the aerofoil section. This may increase stability of the blade on the block 13c' and ensure correct orientation of the blade when it is connected to the second support fixture 1'. The convex surface 21 also limits roll and pitch rotations of the blade.

The support surfaces of the third support structures 13c have a uniform size and shape in each fixture, such that their respective normal vectors have the same angle with respect to the common plane. That is, the normal vector at a specific point on the support surface of one of the third support structures 13c will have the same angle with respect to the common plane as that of the normal vector at a corresponding point on the support surface of another one of the third support structures 13c. In this way, the plurality of blades will be supported with a common facing orientation with respect to the image plane of the camera.

The first fixture 1 and the second fixture 1' can be used to hold the batch of blades while a pair of images of the blades is captured by the camera, a first image of the concave sides of the blades (when supported by the first fixture 1) and a second image of the convex sides of the blades (when they are supported by the second fixture 1').

Between capturing the first image and the second image, the user may be expected to manually remove the blades from the first fixture and transfer them to the second fixture, or vice versa. However, in preferred embodiments, the first fixture 1 and the second fixture 1' can be reversibly coupled together in a facing configuration while the blades are supported on one of the fixtures, to allow easier transfer from one fixture to another.

To facilitate this, the upper surface 14 of the first fixture 1 comprises a first pair of couplers 11, 12 that are configured to engage a corresponding second pair of couplers 11', 12' on the upper surface 14 of the second fixture 1'. In the present implementation, the first pair of couplers comprises a first locking plug 11, in the form of a triangular-shaped projection from the upper surface 14 of the hub 9, and a first locking socket 12, in the form of a square-shaped depression or hole on the upper surface 14 of the hub 9. The second pair of couplers comprises a second locking socket 11', in the form of a triangular-shaped depression or hole on the upper surface 14 of the hub 9, and a first locking plug 12', in the form of a square-shaped projection from the upper surface 14 of the hub 9. The first locking plug 11 is configured to be received within and fill the second locking socket 11' of the second fixture 1' and the second locking plug 12' is configured to be received within and fill the first locking socket 12 of the first fixture 1. The first and second pair of couplers allow the first and second fixtures to be coupled in a single facing configuration, and any suitably shaped couplers can be used for this.

In the facing configuration, the arms 8 and hub 9 of the first fixture 1 will be aligned with the arms 8 and hub 9 of the second fixture 1', such that the support structures of both the first and second fixtures engage and contact the blades. That is, the blades can be retained in a space between the support surfaces of respective pairs of aligned mounts.

In this way, the entire batch of blades can be readily moved and, for example, flipped at the same time.

To capture the pair of images required for the visual analysis, the user may be expected to do so by:
1. placing a batch of six blades 6 onto the first fixture 1 while it is positioned horizontally on the platform 7, so that the blades 6 are supported by the first fixture 1 in the first common facing orientation with respect to the camera;
2. capturing an image of the concave sides of the blades 6 while placed on the first fixture 1;
3. while the blades 6 are in position on the first fixture 1, covering the blades 6 with the second fixture 1' and coupling the second fixture 1' to the first fixture 1, so that the blades will be retained in a space between the first and second fixtures;
4. flipping the coupled assembly upside-down so that the second fixture 1' is positioned horizontally on the platform 7 and the weight of the blades 6 are supported by the second fixture 1';
5. removing the first fixture 1 to reveal the convex sides of the blades 6 in the second common facing orientation with respect to the camera;
6. capturing an image of the convex sides of the blades 6 while supported by the second fixture 1'; and
7. replacing the batch of 6 blades by another batch of 6 blades and repeating steps 1 to 6.

By using the first and second fixtures to flip the six blades at the same time, the image capturing method to be carried out by the user will be simpler and faster than hypothetical arrangements in which individual blades may be flipped between the first facing orientation and the second orientation separately. Further, the first and second fixtures ensure that the blades can be arranged with consistent order and placement in both images of the pair of images.

It will be appreciated that the first and second fixtures can be used in any order to capture a given pair of images. For example, for each batch of blades to be imaged, the user may place them on either the first fixture or the second fixture to take the initial image of the pair of images for the batch. This is because, as described in further detail below, a marker may be used to indicate to the processor which fixture has been used and thus the facing orientation of the blades in the image.

With reference to FIGS. 3 and 4, each fixture 1, 1' further comprises a fiducial marker 10, 10' located at the centre of the hexagonal upper surface 14 of the hub 9. The marker 10 provides the computer 4 with information that is to be used by the processor when processing the images for the visual analysis. In the specific implementation of FIGS. 3 and 4, the marker is in the form of a so-called "ArUco" marker that stores encoded information in a format that is able to be decoded by the processor when imaged.

The marker 10, 10' stores data indicating (to the processor) one or more of the following: the facing orientation of the blades, i.e. whether the mounts are arranged to support the blades in the first facing orientation or the second facing orientation; the angular position of the mounts (and thus blades in the image) relative to the marker (which defines the origin); the angular position of a mount and thus blade in the image that should be processed first by the processor during the visual analysis; and an indication of the order by which the remaining blades should be processed during the visual analysis—this may be an indication of the circumferential direction about the hub 9 along which the mounts are arranged. The orientation of the triangular shaped couplers 11, 11' may also or instead be used as a marker that points to the first blade in the image to be processed and/or the order (circumferential direction) along which the blades in the image should be processed.

The marker 10 of the first fixture 1 and the marker 10' of the second fixture 1' indicate the angular positions of a pair of mounts that are to be aligned when the first fixture 1 and the second fixture 1' are in the facing configuration. That is, the marker 10 of the first fixture 1 indicates the angular position of a given mount of the first fixture 1, and the marker 10' of the second fixture 1' indicates the angular position of a mount of the second fixture 1' that will be aligned with the mount of the first fixture 1 that is indicated by the first marker 10.

The markers indicate opposite directions in the image along which the blades should be processed during the visual analysis. For example, the marker 10 of the first fixture 1 may indicate a clockwise direction along the circumferential line about the hub 9 (when viewed from the camera), to direct the processor to analyse the blades in the first image in a clockwise order, and the marker 10' of the second fixture 1' may indicate a counter-clockwise direction along the circumferential line about the hub 9 (when viewed from the camera), to direct the processor to analyse the blades in the second image in a counter-clockwise order, or vice versa. This will ensure that, for each pair of images of the same batch of blades, the blades will be processed sequentially in the same order in both images. This may be advantageous in that it allows the processor to trace and correlate a blade in the first image of the pair with the same blade in the second image of the pair.

It is noted here that the fixtures described above can be readily designed using computer aided design (CAD) software and fabricated using 3D additive printing. Additionally, the fixtures 1, 1' may be manufactured from a material with a middle gray reference colour, e.g. 18% gray colour pigment, so that the fixture can be used to calibrate the camera with respect to lighting, i.e. to control exposure and white balance of the camera. Alternatively, instead of using a material having 18% gray colour filaments, the fixtures may be spray painted to a correct 18% gray level, or can be provided with a gray card that is attached to each fixture at a position falling within the field of view of the camera, so that the gray card can be used to calibrate the camera.

Although the fixtures have been described above as being configured to hold six blades, this is not required (although desirable). The fixtures may comprise any number of mounts and thus hold any number of blades as may be desired or suitable for the visual analysis in question. Further, the support surfaces can take any desired shape or form that is suitable for holding the components to be investigated with a common facing orientation with respect to the camera.

It will also be appreciated that the fixtures described above can be modified to support different components that are to be visually investigated in a manner described herein. For example, the fixture can be readily changed and adapted to support other blade types. In embodiments, the plurality of mounts are modular, i.e. removably attached to the hub, so that they can be replaced to suit different blade types.

After a pair of images of the blades has been captured by the digital camera using the first and second fixture, the images will be subjected to the automated visual analysis method of the technology described herein.

The visual analysis method investigates discoloration (and thus sulfidation) on the blades by processing each image in turn. The method comprises, for each blade in the image, identifying a group of pixels that represents a region of interest (the shank region) of the blade and comparing the colour values of that group of pixels to a predetermined threshold colour value. The predetermined threshold colour value is associated with discoloration of the component as a result of sulfidation in the region of interest and represents the boundary of a range of colour values that has been predetermined as being representative of sulfidation on the shank region. The method may accordingly determine whether sulfidation has occurred in the shank region based on whether or not the colour values in the group of pixels fall within the range of colour values representative of sulfidation. The method may also classify the extent of sulfidation in the region of interest based on the total number of pixels in the group that have colour values falling within the sulfidation range.

Figure 5:
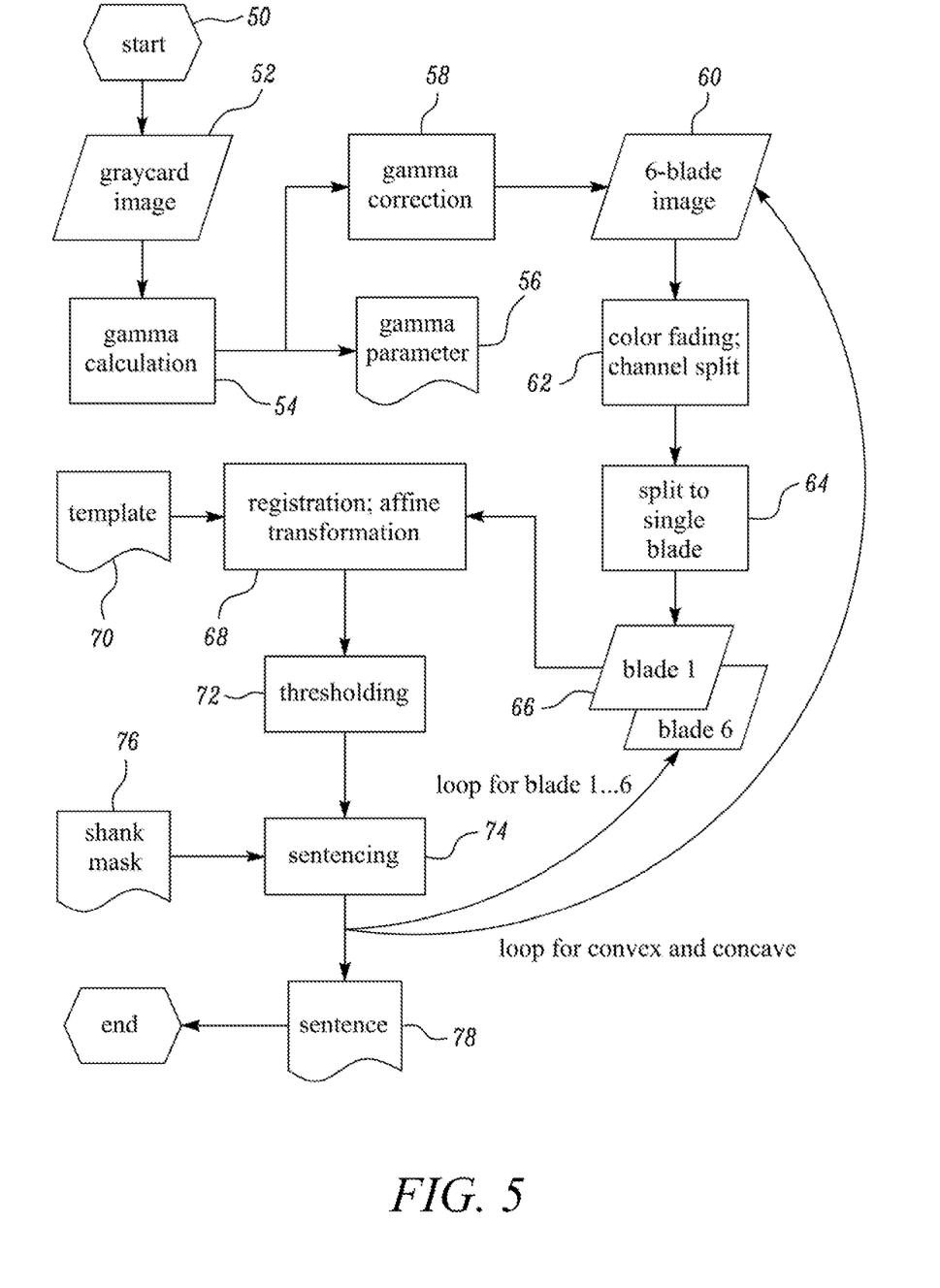
FIG. 5 is a flow chart depicting a method of automated visual analysis to investigate discolouring on components of a gas turbine engine, in accordance with an embodiment of the technology described herein.

FIG. 5 is a flow chart depicting the automated visual analysis in greater detail, in accordance with an embodiment of the technology described herein. The method will be carried out automatically and may be initiated in response to an input received by the user through the input/output interface of the computer 4.

The method is described with respect to processing a single pair of images of a batch of six blades, in particular the first and second images described above. However, it will be appreciated that in embodiments the method will be repeated for plural batches of blades (by processing respective pairs of images) that form the entire set of IPT blades of the gas turbine engine. In that regard, an intermediate pressure turbine typically comprises a set of one-hundred and fourteen blades, or nineteen batches of six blades, so the method may be performed for nineteen pairs of images.

The method begins by calibrating the images to account for the lighting conditions at the time the image was captured. It will be appreciated that the colour values for each RGB channel of an image pixel is dependent on the lighting conditions (e.g. how bright the ambient environment is) during image capture. For example, when a scene is imaged in poor lighting conditions, the image will have pixel colour values that are set at lower intensity values (on the 0-255 scale for each RGB channel) as compared to the pixel intensity values in an image of the same scene captured in very bright lighting conditions. Therefore, in order to allow an accurate and objective inspection of the discoloration of the blades across different images, the effect of the lighting conditions on the colour values is corrected for.

In the illustrated embodiment, this is done by performing a gamma correction, which adjusts the colour values in the images based on a correction factor (a so-called gamma parameter).

The gamma correction begins at step 52 of FIG. 5, at which the processor reads image data (image pixel colour values) representing a middle gray reference object. A middle gray reference object is an object having a colour that, when imaged, represents the mid-tone of the image. Under correct exposure (lighting conditions), the object should have a colour value at the middle of the intensity scale between 0 (dark) and 255 (bright) for each of the red, green and blue pixel component values. That is, the colour of the reference object in an image should have predefined colour values of 127, 127, 127 for a 24-bit RGB colour format.

As described above, in embodiments the fixture that holds the blades during image capture is manufactured from a material with a middle gray reference colour or is otherwise provided with a gray card. Accordingly, in those embodiments the middle gray reference object may be the fixture itself or a gray card attached to the fixture in one of the images of the blades. In other embodiments, however, the image data representing a middle gray reference object may be from a separate image to that of the pair of images of the blades, but captured under the same lighting conditions.

At step 54, the processor determines the correction factor based on the RGB colour values of the pixels that represent the reference object. In particular, the processor reviews the colour values of the reference object pixels in the image to determine the extent by which the colour values differ from the value 127, which is indicative of how under or over exposed the image is.

This determination comprises, firstly, converting the original colour values, $I_{(c)}$, of the reference object pixels to floating point intensity values, $I^f_{(c)}$, spanning a range of 0 to 1.0 (i.e. [0,1]) by applying the following conversion:

$$I^f_{[c]} = \frac{I_{[c]} - I_{[c],min}}{I_{[c],max} - I_{[c],min}}, \text{ for } c \in \{r, g, b\}$$

where $I_{min}$ is the minimum colour value (in the original range of values between 0 and 255) for the reference object pixels, and $I_{max}$ is the maximum colour value (in the original range between 0 and 255) for the reference object pixels.

Secondly, the determination comprises using the floating point colour values, $I^f_{(c)}$, to calculate a gamma parameter (the correction factor), $\gamma$, for each RGB colour channel, according to the following equation:

$$\gamma_{[c]} = \frac{\log I^f_{[c]}}{\log 0.5}, \text{ for } c \in \{r, g, b\}$$

where the value 0.5 in the denominator represents the middle gray (as 0.5 is the mid-point of 0~1).

The gamma parameters determined at step 54 are stored in a memory of the system at step 56, so that it can be retrieved for later use by the processor.

At step 58, the processor retrieves the gamma parameters and uses them to perform the gamma correction of the pair of images of the batch of blades. The gamma correction is performed, for each image of the pair, by applying the gamma parameters to each pixel colour in the image, $P^f_{(c)}$, to obtain new, gamma corrected image, $P'_{(c)}$, according to the following equation:

$$P'_{(c)} = P^f_{(c)} \times \gamma_{(c)}, \text{ for } c \in \{r, g, b\}$$

The corrected blade image, $P'_{(c)}$, is then stored in memory.

In this way, the method ensures that consistent exposure is achieved across different images independent of lighting conditions, camera types, operators, etc. This may be advantageous to increase the accuracy and repeatability of the visual analysis.

Although the gamma correction has been described above as being performed for a single pair of images, the gamma correction may be performed for more than one pair of blade images at step 58, i.e. before continuing with the visual analysis for a specific pair. For example, a user may have captured plural pairs of images for respective batches of blades under the same lighting conditions, and in that case the gamma correction at step 58 may be performed for one or more or all of those pairs of images. The determination of a gamma parameter will be performed once for every image capture session, or rather once for every time the lighting conditions change, although the correction itself will be performed for each image.

After the gamma correction has been applied for the pair of images, the first image of the pair of gamma corrected images is read from memory at step 60.

At step 62, the colour values of the first image are modified to eliminate colours that are not of interest to the visual analysis and to keep only the colours that are of interest. In that regard, the Applicant has recognized that the Lightness of the pixel colours (from black to white) is a good indicator of sulfidation, and that other components of the pixel colours, particularly the Hue of the colours, adversely confuse inspection of the Lightness of the pixels. Accordingly, at step 62 the processor removes the Hue component of the pixel colours in a process referred to as colour fading. This is done, for each pixel in the image, by converting the RGB colour values to the HSV colour space (hue, saturation, value), and then setting the Hue component value to zero (no colour). The HSV colour values, for each pixel, are then converted back to the RGB colour space.

The Lightness of the colours in the image is then revealed for each pixel by converting the colour faded RGB colour values to the LAB colour space, which expresses colour as three values: L*for the lightness from black to white, a*from green (−) to red (+), and b*from blue (−) to yellow (+). In this way, the shades of the colours, which are of interest, are retained and the other colours are by-passed so as not to confuse the investigation. The three LAB colour channels (components) are then split so that the Lightness channel (L) can be subsequently used to investigate discoloration as a result of sulfidation.

After converting the colour values to the LAB colour space, the method proceeds to step 64, at which the processor segments the first image into a group of six sub-images, one sub-image for each blade in the first image, so that those sub-images may be processed more efficiently by the processor to determine the presence and extent of discoloration.

The image may be divided using any image segmentation method known in the art. However, in embodiments this is done by performing a so-called "Watershed" algorithm. The objective of the watershed algorithm is to identify clusters of pixels (or rather, sections of the first image) that belong to the blades in the first image by identifying contiguous pixels having the same or similar intensity (lightness L) values that differ from values of the surrounding pixels (background image sections).

Intuitively, the watershed algorithm can be thought of as a landscape that is flooded by water. The elevation of the landscape across the image is represented by the colour values (the lightness values in this case) of the pixels, where higher values represent higher elevations and lower values represent lower elevations. In the present example, the Lightness values of pixels corresponding to a blade will be lower than those of pixels belonging to the background (i.e. the fixture). The watershed algorithm therefore determines the sections of the image that represent blades as basins and the sections of the image that represent the background as basin seeds (i.e. high elevation sections).

The watershed algorithm starts from predefined basin markers, i.e. specific pixels, which have been identified as belonging to the basin sections. The algorithm then floods the basins until basins attributed to different markers meet on so-called watershed lines. In some cases, the basin markers are automatically identified by the processor as pixels corresponding to a local minima of the image, from which basins are flooded. However, in embodiments they are determined automatically by the processor using an image thresholding operation and morphological operators.

For example, the automatic determination begins by performing a crude image thresholding operation, in particular an Otsu thresholding operation (as is known in the art), to determine sections of the image that are likely part of the blades and sections of the image that are likely part of the background. This is done by comparing the intensity of each Lightness value with a predetermined threshold value. Pixels whose values satisfy the threshold condition are classified and flagged as being likely part of the blade and pixels whose colour values do not satisfy the threshold condition are classified and flagged as being likely part of the background. In the present example, pixels whose intensity values are below the predetermined threshold value will satisfy the threshold condition and be flagged as being likely part of the blade.

Morphological erosion techniques are then used to identify which pixels of those that have been flagged as likely belonging to the object are certain to belong to the blades, and morphological dilation techniques are used to identify which pixels of those that have been flagged as likely belonging to the background are certain to belong to the background.

After determining sections (pixels) that certainly belong to the blades, those sections are used as markers of the basins (which will also form part of the watershed lines) for the watershed segmentation. Correspondingly, the sections (pixels) that have been identified as certainly belonging to the background are used as markers of the basin seed (elevated sections), that define the basin limits for the watershed segmentation.

As mentioned above, the watershed algorithm identifies sections in the image having the same or similar lightness values compared to surrounding sections in the image. Sections corresponding to lower elevation (lightness values) in the watershed topography (and thus the blades) can then be stored in memory as separate sub-images.

At substantially the same time as step 64, the processor determines the order by which the sub-images should be processed during the visual analysis. This is done by decoding information stored in the ArUco marker affixed to the fixture in the first image. As described above, the six blades in the first image are arranged in series along a circumferential line about the marker (by virtue of their mounting fixture), which indicates the angular position of a blade in the first image (relative to the marker) from which the processor should begin the investigation and a direction along the circumferential line along which the blades should be processed in series. From this information, the processor determines the order by which the sub-images should be processed.

Each sub-image is stored in memory at step 66 with a unique index value, e.g. where an index value of "1" is given to the first sub-image to be processed, a value for "2" for the second and so on and so forth, and the processor is configured to process the sub-images in sequence in the order of the index values (in ascending index value order, for example).

At step 66, the processor reads the first sub-image to be processed, before proceeding to step 68 at which point the processor operates to identify a shank region of interest of the blade in the sub-image.

Identification of the shank region is carried out automatically using a process known as "template matching". Template matching is a digital image process to find a region within the sub-image that matches a predefined template image. In this embodiment, the predetermined template image has been tailored to and defines the shape and dimensions of a shank region of the blade.

The processor reads the template image (in a process illustrated by step 70 of the method of FIG. 5) and compares that template image with different regions of the sub-image in order to match features of the template image with those in the sub-image. A "matched" region of the sub-image is then flagged as the region of interest.

Any known templating matching operation can be used to identify the shank region. However, in this embodiment the template matching operation superimposes the template image at different positions over the sub-image and calculates, for respective pairs of overlapping pixels at a superimposed position, the cross-products of the colour (lightness) values. A normalized cross-correlation coefficient is calculated for each superimposed position, where the cross-correlation coefficient is the sum of the cross-products over the whole area spanned by the template. The template image may be superimposed at different positions on the sub-image by centring the template image on each pixel of the sub-image in turn.

The cross-correlation coefficient will be greatest at superimposed positions where a group of pixels in the sub-image matches the entire template image. Accordingly, the group of pixels in the sub-image that yields the highest cross-correlation coefficient (when overlapped by the template image) is flagged as the region of interest.

Data indicating the region of interest within the sub-image is stored in a memory of the system for later use. This data may be in the form of an image mask, referred to herein as a "shank mask", which is a binary image of the same size and scale as the sub-image, where each pixel in the binary image is represented in memory as a single bit (having a value of "0" or "1") and is set to a value of "1" if the corresponding pixel in the sub-image (i.e. a pixel in the sub-image having the same pixel co-ordinate position as that of the binary image pixel in question) belongs to the shank region of the blade, or is set to a value of "0" if the corresponding pixel in in the sub-image does not belong to the shank region of the blade, or vice versa.

To facilitate easier identification of the region of interest using template matching, as described above, the sub-images may be subjected to a preliminary image registration process before template matching. The image registration process aligns and scales the sub-images to ensure that they have a consistent and uniform orientation and size. This is done by applying geometric transformations to the sub-images.

Thus, at step 68, the sub-images may be subjected to an affine transformation to rotate the individual sub-images to the same orientation. In this regard, the processor may read and decode the angular positions of the blades from the ArUco marker of the first image to determine the angular orientation of each sub-image (with respect to the marker) and thus the extent of rotation required (if at all) for each sub-image to ensure that all of the sub-images have a consistent and uniform orientation. This may facilitate easier and thus quicker identification of the shank region of the blades.

Further, the sub-images may be subjected at step 68 to a further affine transformation, in particular a scaling operation to ensure that the size of the sub-images will be uniform. It will be appreciated that the size of the blades (and so the sub-images) may have different sizes (in terms of pixel area) in different images of the batch of blades, depending on the height of the camera during image capture. Therefore, scaling the sub-images to a uniform, e.g. predefined or predetermined, size may enable the processor to readily determine the regions of interest using a predefined template. In that regard, the predefined size may be set or selected based on the scale of the template image to be used for identifying the shank region. For example, the sub-images may be scaled so that there is a 1:1 scale between the size of the template image and the shank region in the scaled sub-images.

The scaling operation itself includes processing the first image to determine the size of the ArUco marker in terms of its pixel area. The operation then determines an appropriate scaling factor for the sub-images by comparing the determined size of the ArUco marker in the image to a predefined target size for the marker. The scaling factor will be the ratio of the target size of the marker to the determined marker size. Thus, if the target size is twice that of the determined size, the scaling factor will be 2, and if the target size is half the target size the ratio will be 0.5. The scaling operation will then use that scaling factor to enlarge or shrink the sub-images of the blades by the scaling factor in all directions.

In other embodiments, a scaling operation is performed at the same time as the template matching operation by using a Powell minimization algorithm (known in the art), which operates to find the optimal cross-correlation matching score by considering sizing variance.

The algorithm takes the scaling factor as an input variable and determines the optimal cross-correlation score according to the optimal scaling. In other words, the Powell optimization algorithm is used to find the maximum cross-correlation coefficient during the template matching operation while at the same time optimizing the scaling of the sub-image with respect to the template image. In this way, scaling and thus pattern matching can be done more precisely.

After identifying the shank region of interest in the sub-image, the processor proceeds to step 72, at which point the processor performs a thresholding operation on the sub-image in question.

The thresholding operation classifies each pixel in the sub-image as being discoloured or not. This is done by comparing the Lightness component colour value of each pixel in the sub-image to a predetermined threshold Lightness value (which correspondingly has a zero Hue component). The predetermined threshold Lightness value represents the boundary of a range of Lightness values that has been predetermined as representative of sulfidation on the shank region.

The threshold Lightness value may be predetermined by analysing a set of pre-defined reference data. For example, a manual inspection of the shank regions for a pool of (e.g. 80) reference blades is performed using conventional visual analysis techniques, and images of the reference blades that have been characterised as being discoloured are used as reference data from which a suitable threshold Lightness value indicative of sulfidation is determined.

In the present example, the Lightness values of pixels corresponding to a blade that is discoloured due to sulfidation will be lower than those of pixels corresponding to a blade that is not discoloured due to sulfidation. Accordingly, if it is determined at step 72 that the Lightness value is equal to or lower than the threshold value then the pixel (or correspondingly, the region of the blade that is represented by the pixel) is classified as being discoloured. Otherwise, if the Lightness value is higher than the threshold value then the pixel (or the blade region) is classified as not being discoloured.

The entire sub-image can be classified in this way, and the result of the classification can be stored in memory as a binary image, where each pixel in the image is represented by either a value of "1", indicating that the pixel is discoloured, or a value of "0", indicating that the pixel is not discoloured. Alternatively, a value of "1" can be used to indicate that the pixel is not discoloured, and a value of "0" can be used to indicate that the pixel is discoloured.

At step 74, the processor numerically quantifies ("sentences") the extent of discoloration across the shank region by determining a ratio of the number of discoloured pixels in the region of interest to the total number of pixels in the region of interest. The extent of sulfidation across the shank region is directly proportional to the ratio value, where higher ratio values are indicative of higher levels of sulfidation. Therefore the extent of sulfidation is quantified based on the determined ratio value.

To ensure that only the pixels in the region of interest are considered during the sentencing at step 74, the sentencing operation reads from memory, at step 76, the binary shank mask and intersects the shank mask with the Lightness channel of the sub-image (i.e. the sub-image restricted to colour values of the Lightness channel). The pixels in the sub-image that intersect with pixels in the shank mask having a value of "1", indicating that the pixel belongs to the region of interest, are considered as being in the region of interest when determining the ratio of the number of discoloured pixels to total pixels in the region.

In embodiments such as that of FIG. 5, the range of possible ratio values (from 0 to 1.0) is quantized by the processor into five discrete sub-ranges, one sub-range for each of the known "discoloration scores" typically used to quantify the extent of sulfidation of the blades, as described above. If the determined ratio of discoloured pixels to total number of pixels in the region of interest falls within a given sub-range, the region in question is given a discoloration score that is equal to the score associated with that sub-range.

The range of possible ratio values may be quantized in any suitable manner. However, in embodiments the range of possible ratio values is quantized offline based on a statistical analysis of predetermined reference data. The reference data may be predetermined by performing steps 50-74 of the visual analysis method described above for images of plural reference blades, for which the extent of sulfidation of each shank region has been classified independently as corresponding to one of the five discoloration scores (using conventional visual analysis techniques described above in the background section). The calculated ratios of discoloured pixels to total number of pixels in the regions of interest of the reference blades are then used as the reference data that is analysed to determine a suitable sub-range for each discoloration score.

Any suitable statistical analysis can be used to quantize the range of possible ratio values in this way. In embodiments, however, this is done using a vector quantization technique known as "k-means clustering". Further, a mathematical model (e.g. a K-means clustering model) defining the relationship between discoloration ratio and the five discoloration scores is determined based on the statistical analysis and is used to score blades that have not been classified independently. Therefore, in embodiments, the processor at step 74 inputs the determined ratio into the mathematical model and receives as an output the appropriate score in the range of {1,2,3,4,5}, where the score "1" means no or little discoloration (and thus minimal sulfidation) and score "5" means severe discoloration (severe sulfidation).

After sentencing the blade corresponding to the sub-image in question at step 74, the method returns to step 66, at which the processor reads the next sub-image in the sequence of sub-images to which the first image has been divided. The next sub-image is then processed according to steps 68 through 74 to sentence the associated blade. The processor will continue to loop in this manner until each sub-image (and thus blade) in the first image has been processed and sentenced. The method will then return to step 60 to process the second image in the pair of images according to steps 60 through 74 until all of the blades (sub-images) in the second image have been processed.

The discoloration scores for each blade are stored in a memory and/or outputted to the user at step 78, before the method terminates.

Although the colour fading and channel splitting process of step 62 in FIG. 5 has been described above as being performed before splitting the image into a plurality of sub-images of the blades (step 64), this step can instead be performed after step 64 and at any point before the thresholding step described with respect to step 72.

Although the visual analysis method has been described above with respect to comparing a Lightness value to a predetermined threshold Lightness value, this is not required. For example, it is equally possible for the region of interest to be classified based on a comparison of the intensity values of the pixels in the RGB colour space to predetermined threshold values in the RGB colour space.

Further, it will be appreciated that although the technology herein has been described above with respect to determining an extent of sulfidation of IPT blades of a gas turbine engine, the technology described herein is applicable more widely in that it can be used for any application where it is beneficial to investigate the presence and/or extent of discoloration of a component. For example, the technology described herein may be used to investigate discoloration of a component that has been caused as a result of heat damage, as opposed to sulfidation-based corrosion specifically. In that case, a suitable threshold colour value representative of heat damage may be predetermined based on reference data (for reference components for which the extent of heat damage is known). The automated visual analysis may then compare a colour value of pixels representing the components to the predetermined threshold value to classify the extent of heat damage.

It will be understood that the technology described herein is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A fixture for supporting a plurality of gas turbine engine blades that are to be imaged, the fixture comprising:
a plurality of interconnected mounts arranged to lie within a common plane;
wherein:
each mount comprises at least one support surface for supporting a respective blade; and
support surfaces of respective mounts are uniformly shaped and oriented such that their respective normal vectors have the same angle with respect to the common plane; wherein each mount comprises:
a first support structure comprising a base portion and two parallel side walls extending from a first support surface of the base portion;
wherein a space is defined between the two side walls for receiving a root portion of the respective blade;
a second support structure comprising a cuboidal block having a second support surface that is parallel to the common plane; and
a third support structure in the form of a block having a third support surface for supporting an aerofoil section of the respective blade.

2. The fixture of claim 1, wherein the plurality of mounts are:
interconnected via a central hub; and
arranged at spaced positions in a circumferential path about the central hub, such that each mount has a unique angular position about the hub.

3. The fixture of claim 1, further comprising a gray card or a middle gray reference colour.

4. The fixture of claim 3, wherein:
the side walls extend perpendicularly to the common plane; and
the first support surface of the base portion is oblique to the side walls.

5. The fixture of claim 1, wherein the third support surface is a concave support surface for abutting a convex surface of the aerofoil section.

6. The fixture of claim 1, wherein the third support surface is a convex support surface for abutting a concave surface of the aerofoil section.

7. A kit for supporting a plurality of gas turbine engine blades in two different facing orientations for imaging, the kit comprising:
a first fixture comprising:
a plurality of interconnected mounts arranged to lie within a common plane;
wherein:
each mount comprises at least one support surface for supporting a respective blade; and
support surfaces of respective mounts are uniformly shaped and oriented such that their respective normal vectors have the same angle with respect to the common plane; wherein
each mount comprises:
a first support structure comprising a base portion and two parallel side walls extending from a first support surface of the base portion;
wherein a space is defined between the two side walls for receiving a root portion of the respective blade; and
a second support structure comprising a cuboidal block having a second support surface that is parallel to the common plane; and
a third support structure in the form of a block having a third support surface for supporting an aerofoil section of the respective blade; wherein the third support surface is a concave support surface for abutting a convex surface of the aerofoil section for supporting the blade in a first facing orientation at which concave sides of the blades face away from the mounts; and
a second fixture comprising:
a plurality of interconnected mounts arranged to lie within a common plane;
wherein:
each mount comprises at least one support surface for supporting a respective blade; and
support surfaces of respective mounts are uniformly shaped and oriented such that their respective normal vectors have the same angle with respect to the common plane; wherein
each mount comprises:
a first support structure comprising a base portion and two parallel side walls extending from a first support surface of the base portion;
wherein a space is defined between the two side walls for receiving a root portion of the respective blade; and
a second support structure comprising a cuboidal block having a second support surface that is parallel to the common plane; and
a third support structure in the form of a block having a third support surface for supporting an aerofoil section of the respective blade;
wherein the third support surface is a convex support surface for abutting a concave surface of the aerofoil section for supporting the blade in a second facing orientation at which convex sides of the blades face away from the mounts.

8. The kit of claim 7, wherein the first fixture and the second fixture are configured to cooperate in that:
the first fixture comprises a first coupler that is configured to engage a second coupler of the second fixture, to removably couple the first fixture and the second fixture in a facing configuration;
wherein, when in the facing configuration, the mounts of the first fixture are aligned with the mounts of the second fixture such that a blade can be retained in a space between the support surfaces of a respective pair of aligned mounts.

9. The kit of claim 8, wherein the first coupler and the second coupler comprise a plug-and-socket arrangement.

10. The kit of claim 8, wherein the first coupler and the second coupler are configured such that the first fixture and the second fixture are able to be coupled in one facing configuration only.

11. The kit of claim 10, wherein:
for each one of the first fixture and the second fixture the plurality of mounts are interconnected via a central hub; and
the plurality of mounts are arranged at spaced positions in a circumferential path about the central hub, such that each mount has a unique angular position about the hub;
each one of the first fixture and the second fixture comprises a fiducial marker that is readable by a computer processor when digitally imaged; and
the fiducial marker of the first fixture indicates the unique angular position of a mount of the first fixture; and
the fiducial marker of the second fixture indicates the unique angular position of a mount of the second fixture that will be aligned with the indicated mount of the first fixture, when the first fixture and the second fixture are in the facing configuration.

12. The kit of claim 11, wherein:
the fiducial marker of the first fixture indicates a first circumferential direction about the hub of the first fixture; and
the fiducial marker of the second fixture indicates a second circumferential direction about the hub of the second fixture;
wherein the first direction is opposite to the second direction.

13. The kit of claim 11, wherein:
the fiducial marker of the first fixture indicates the first facing orientation at which the mounts of the first fixture are configured to support the blades; and
the fiducial marker of the second fixture indicates the second facing orientation at which the mounts of the second fixture are configured to support the blades.

14. A method of imaging a plurality of gas turbine engine blades, comprising:
providing a fixture comprising:
a plurality of interconnected mounts arranged to lie within a common plane;
wherein:
each mount comprises at least one support surface for supporting a respective blade; and
support surfaces of respective mounts are uniformly shaped and oriented such that their respective normal vectors have the same angle with respect to the common plane; wherein
each mount comprises:
a first support structure comprising a base portion and two parallel side walls extending from a first support surface of the base portion;
wherein a space is defined between the two side walls for receiving a root portion of the respective blade; and
a second support structure comprising a cuboidal block having a second support surface that is parallel to the common plane; and
providing a first batch of plural gas turbine engine blades to be imaged;
providing a digital camera for imaging the batch of blades;
placing the fixture on a platform, such that the support surfaces of the fixture face the camera;
placing respective blades of the first batch on the at least one support surface of respective mounts of the fixture, such that the blades have a first common facing orientation with respect to the camera; and
using the digital camera to capture an image of the blades in the first common facing orientation.

15. A method of imaging a plurality of gas turbine engine blades, comprising providing a kit comprising:
a first fixture comprising:
a plurality of interconnected mounts arranged to lie within a common plane;
wherein:
each mount comprises at least one support surface for supporting a respective blade; and
support surfaces of respective mounts are uniformly shaped and oriented such that their respective normal vectors have the same angle with respect to the common plane; wherein
each mount comprises:
a first support structure comprising a base portion and two parallel side walls extending from a first support surface of the base portion;
wherein a space is defined between the two side walls for receiving a root portion of the respective blade; and
a second support structure comprising a cuboidal block having a second support surface that is parallel to the common plane; and
a third support structure in the form of a block having a third support surface for supporting an aerofoil section of the respective blade; wherein the third support surface is a concave support surface for abutting a convex surface of the aerofoil section for supporting the blade in a first facing orientation at which concave sides of the blades face away from the mounts; and
a second fixture comprising:
a plurality of interconnected mounts arranged to lie within a common plane;
wherein:
each mount comprises at least one support surface for supporting a respective blade; and
support surfaces of respective mounts are uniformly shaped and oriented such that their respective normal vectors have the same angle with respect to the common plane; wherein
each mount comprises:
a first support structure comprising a base portion and two parallel side walls extending from a first support surface of the base portion;
wherein a space is defined between the two side walls for receiving a root portion of the respective blade; and
a second support structure comprising a cuboidal block having a second support surface that is parallel to the common plane; and
a third support structure in the form of a block having a third support surface for supporting an aerofoil section of the respective blade;
wherein the third support surface is a convex support surface for abutting a concave surface of the aerofoil section for supporting the blade in a second facing orientation at which convex sides of the blades face away from the mounts,
providing a first batch of plural gas turbine engine blades to be imaged;
providing a digital camera for imaging the batch of blades;
placing a first one of the pair of fixtures on a platform, such that the support surfaces of the first fixture face the camera;
placing respective blades of the first batch on the at least one support surface of respective mounts of the first fixture, such that the blades have a first common facing orientation with respect to the camera;
using the digital camera to capture an image of the blades in the first common facing orientation;
coupling the pair of fixtures such that the blades are retained in a space between aligned mounts of the pair of fixtures;
flipping the coupled assembly and placing the second one of the pair of fixtures on the platform such that the support surfaces of the second fixture face the camera;
decoupling the pair of fixtures to reveal the blades in a second common facing orientation with respect to the camera; and
using the digital camera to capture an image of the blades in the second common facing orientation.

16. The method of claim 15, further comprising, after using the digital camera to capture an image of the blades in the second common facing orientation:
providing a second batch of plural gas turbine engine blades to be imaged;

placing respective blades of the second batch on the at least one support surface of respective mounts of the second one of the pair of fixtures, while the second fixture lies on the platform, such that the blades have the second common facing orientation with respect to the camera;

using the digital camera to capture an image of the blades in the second common facing orientation;

coupling the pair of fixtures such that the blades are retained in the space between aligned mounts of the pair of fixtures;

flipping the coupled assembly and placing the first one of the pair of fixtures on the platform such that the support surfaces of the first fixture face the camera;

decoupling the pair of fixtures to reveal the blades in the first common facing orientation with respect to the camera; and using the digital camera to capture an image of the blades in the first common facing orientation.

17. The method of claim 15, wherein using the digital camera to capture an image of the blades in the first facing orientation or the second facing orientation comprises orienting the camera such that its image plane is parallel to the common plane of the respective fixture.

* * * * *